July 18, 1950          L. RAKOCZY          2,515,896

FISHING REEL

Filed June 15, 1949          2 Sheets-Sheet 1

INVENTOR.
Leo Rakoczy.
BY
ATTORNEY.

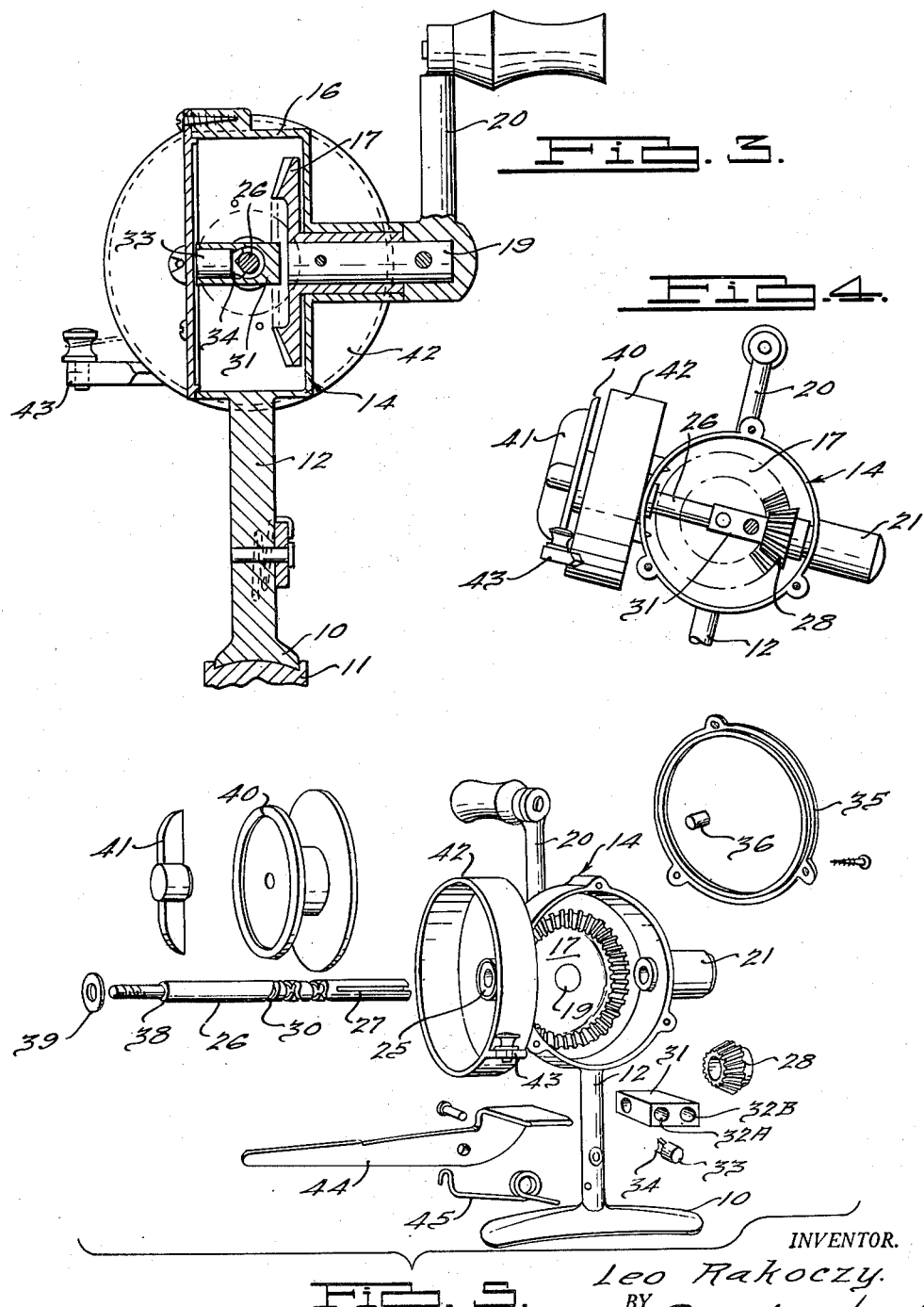

Patented July 18, 1950

2,515,896

UNITED STATES PATENT OFFICE 2,515,896

FISHING REEL

Leo Rakoczy, Detroit, Mich.

Application June 15, 1949, Serial No. 99,178

5 Claims. (Cl. 242—84.4)

This invention relates to improvements in fishing reels and in particular to improved fishing reels of the type known as "spinning reels" wherein the line "spins" from the open end of a non-rotating spool when the bait is cast.

The primary object of the invention is to provide an improved "spinning reel" in which the winding and reciprocating mechanism is novel, compact, and readily manufactured.

Another object of the invention is to provide an improved "spinning reel" with fewer parts than heretofore employed in the winding and reciprocating mechanism.

Another object of the invention is to provide an improved brake in conjunction with the "spinning reel" which is responsive to "feel."

Another object of the invention is to provide an improved "spinning reel" which is conducive to be manufactured by die-casting thereby lessening the cost of manufacture.

Other objects of the invention will become apparent by reference to the following description of a spinning reel embodying the invention taken in connection with the accompanying drawings in which:

Fig. 3 is a vertical cross sectional view of the spinning reel of the invention.

Fig. 4 is a side elevational view of the spinning reel of the invention with the cover of the case removed showing the internal mechanism.

Fig. 5 is an exploded view of the spinning reel of the invention showing the parts thereof in greater detail.

Figure 1:
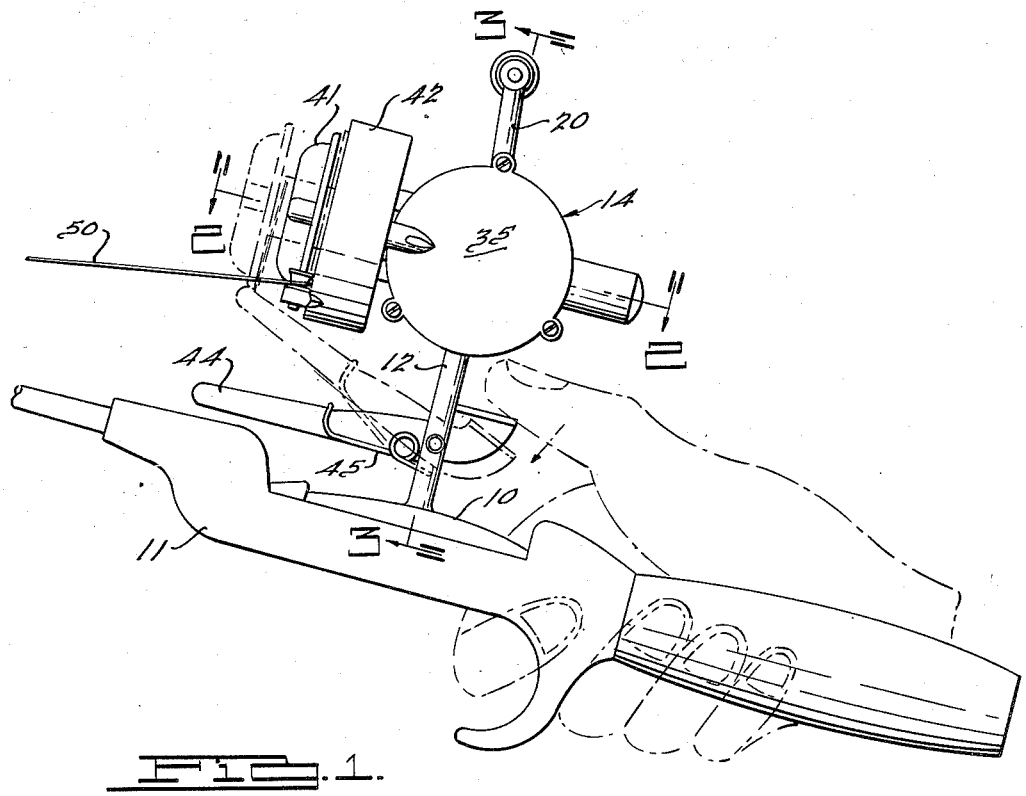
Fig. 1 is a side elevational view of a spinning reel embodying the invention attached to a casting rod showing the action of the brake and the reciprocation of the spool in dotted lines.
Figure 2:
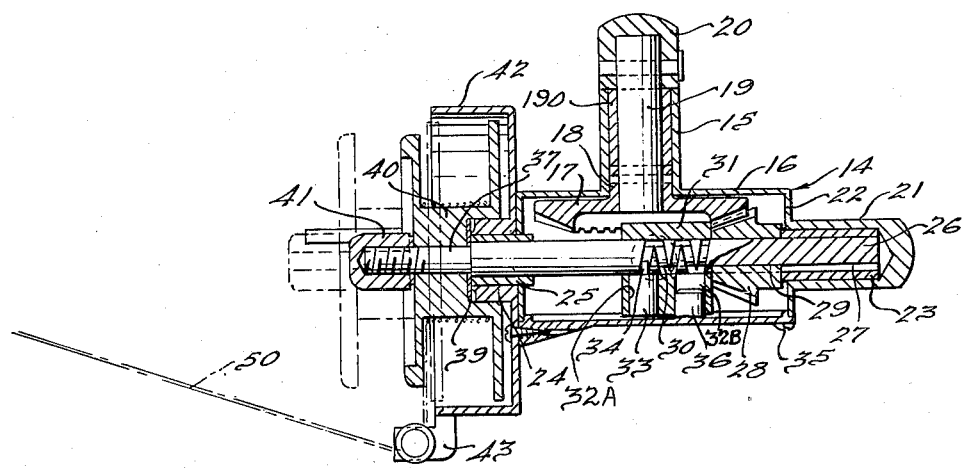
Fig. 2 is a horizontal cross sectional view of the inventive device taken on the line 2—2 of Fig. 1.

The spinning reel of the invention is characterized by feature that the spool containing the line both rotates and reciprocates to level wind the line. The axis of the spool, disposed parallel with the casting rod, is at right angles to and mounted on the case which houses the rotating and reciprocating mechanisms, which mechanism is actuated by the hand crank disposed axially with the case. The device is secured to the casting rod by means of a post and base which positions the device wall above the casting rod.

Referring now to the drawing wherein like numerals refer to like and corresponding parts throughout the several views, the particular embodiment of the invention disclosed for the purpose of illustration comprises a base 10 which is attachable to a casting rod 11 by known means, a post 12 centrally disposed on said base, a gear case 14 mounted on said post 12 housing the actuating mechanism of the device, a hollow shoulder 15 centrally disposed on the back 16 of said gear case 14, a bevel gear 17 disposed within said case 14, having a collar 18 journaled within the shoulder 15, a crank shaft 19 axially secured to said gear 17 and disposed within said shoulder 15, an anti-friction sleeve 190 disposed within said hollow shoulder 15 surrounding said crank shaft 19, a crank 20 secured on said crank shaft 19 and adapted to manually rotate said shaft 19 and said gear 17, a cylinder 21 closed at its outer end formed integral with said case 14 and disposed on the annular side 22 thereof, an antifriction sleeve 23 disposed within the said cylinder 21, a shoulder 24 having an aperture formed therein disposed on the annular side of said case 14 180° removed from said cylinder 21, an anti friction sleeve 25 disposed within the aperture of said shoulder 24, a rotating and reciprocating shaft 26 disposed within and between said cylinder 21 and said shoulder 24 and journaled within said anti-friction sleeves 23 and 25, a slot 27 longitudinally disposed in said shaft 26 adjacent the end of the shaft 26 bearinged within the cylinder 21, a pinion gear 28 mating with said bevel gear 17 carried by said shaft 26, a key 29 formed integral with said pinion gear 28 disposed in the slot 27 preventing relative rotation between said pinion gear 28 and said shaft 26 and permitting said shaft 26 to slide longitudinally within said bevel gear 29 with longitudinal movement of said bevel pinion 29 being prevented by said case and said bevel gear 17, an endless worm or thread 30 cut into the peripheral surface of said shaft 26, a block 31 surrounding said shaft 26, cylindrical key ways 32A and 32B formed in said block 31, a cylindrical key 33 disposed in the keyway 32A, a pawl 34 on said key 33 disposed in mating relation in the endless worm or thread 30, a cover 35 closing said case 14, a cylindrical stud key 36 on said cover 35 disposed in said key way 32B preventing relative rotational and longitudinal movement of said block 31, a left hand threaded diminished end portion 37 on said shaft 26, forming a shoulder 38 thereon, a washer 39 disposed on said diminished end portion 37 abutting said shoulder 38, a spool 40 adapted to contain fishing line disposed on said diminished end portion 37, and a left hand threaded wing nut 41 screwed on said left hand threaded diminished portion 37 securing said spool 40 on said shaft 26 and frictionally preventing relative rotation therebetween, a housing 42 protectively enclosing said spool 40 at its back and annular sides mounted on said case 14, a line pick-up guide 43 mounted on said housing 42 and adapted to feed the line to the spool 40 at right angles thereto, a finger or thumb brake lever 44 pivotally mounted on said post 12 and adopted to contact said spool to prevent rotation of said spool and/or to prevent the line spinning off said spool 40, and a spring 45 normally urging said lever 44 out of engagement with said spool 40.

Rotation of the spool 40 is effected by turning the crank 20 which rotates the crank shaft 19 and the bevel gear 17, which, in turn rotates the pinion gear 28, which rotates the shaft 26 by means of the sliding key connection between the pinion gear 28 and the shaft 26 effected by the key 29 in the pinion gear 28 being disposed in the slot 27 of the shaft 26, and, as the spool 40 is secured on the shaft 26, the spool is rotated thereby, and at an increased R. P. M. relative to the crank 20 due to the bevel gear 17 being larger than the pinion gear 28.

Reciprocation of the spool 40 is effected by the pawl 34 being disposed in mating relationship in the endless thread and groove 30. The pawl 34 is mounted on the cylindrical key 33 rotationally floating in the block 31 so that the pawl 34 may turn to the angle of the endless thread or groove 30 as the groove rides past the pawl in its forward and reverse spirals, which floating feature enables the pawl to be constructed with flat contacting sides for contacting the walls of the groove 30. The pawl 34 is secured in mating relationship with the groove 30 by the case cover 35 abutting the end of the key cylinder 33 which supports the pawl 34. The block 31 is supported by the shaft 26 and is longitudinally positioned and rotationally secured against movement by the key stud 36 carried by the case cover 35. As the pawl 34 is longitudinally stationary, and as the pawl 34 is positioned in mating relationship in the groove 30, the shaft 26 moves forwardly and rearwardly out of and back into the cylinder 21 in a reciprocating movement which, in turn, carries the spool 40 out of and back into the housing 42 in a reciprocating movement past the stationary line pick-up guide 43. The spool 40 therefore reciprocates as it rotates.

In winding line 50 upon the spool 40, the line 50 feeds past the stationary line pick-up guide 43 and is wound upon the spool 40 by the rotational movement thereof and is disposed in crisscross relationship thereon by the reciprocating movement of the spool 40 past the guide 43 thereby level-winding the line 50 upon the spool 40 so that it may be freely cast therefrom without overlapping or frictionally engaged turns of line preventing same.

In spin-casting, the line 50 is fully wound upon the spool 40 as above described, and the line is allowed to spin directly from the spool 40 to the first guide on the pole, not shown. The line 50 is only positioned over the guide 43 when winding in the line. It is advisable when making the case to manually hold the line until the pole is at the desired angle to then release the line.

When a fish is hooked it must be very carefully played as the line and lures used in spin-casting are very light and in playing a fish or with spinning reel equipment the brake or drag on the reel is important. The brake 44 above described and illustrated in the drawings is operated by thumb or finger pressure thereon, and due to the fact that the brake is therefore subject to "feel," the fish may be properly played, and this is an advantage over other "spinning reels" as they are braked or dragged with pressure exerted on the spool or shaft by screw-type mechanisms which are not only not subject to "feel" but also they are extremely difficult to adjust or use while playing a fish. In the brake of the invention, thumb pressure upon the brake 44 will cause the brake arm to contact the spool 40 slowing or stopping its movements depending on the amount of hand-pressure applied on the brake.

From the foregoing description the operation of the spinning reel of the invention is obvious, the improved construction being simple and inexpensive to manufacture.

Although but an embodiment of the invention has been disclosed and described in detail, it is obvious that many changes may be made in the size, shape, arrangement and detail of the various elements of the invention without departing from the spirit and scope thereof as defined by the appended claims.

I claim:

1. A spinning reel comprising a case, a hollow shoulder centrally disposed on the back of said case, a crank shaft disposed within said shoulder, a crank secured on the outer end of said shaft, a bevel gear disposed within said case and secured on said crank shaft for rotation therewith, a cylinder disposed on the side of said case, and shoulder having an aperture therein disposed on the side of said case 180° removed from said cylinder, a shaft rotatably and slidably mounted in and between said cylinder and shoulder having an endless and returning groove cut therein on its peripheral surface in its central area and a slot longitudinally milled therein at the end of said shaft disposed in said cylinder, a pinion gear meshing with said bevel gear disposed on said shaft, a key formed integrally with said pinion gear disposed in the slot of said shaft preventing relative rotation therebetween and permitting longitudinal sliding movement of said shaft within said pinion gear, a block disposed on said shaft having two keyways formed therein, a stud key disposed in one of said keyways preventing rotational and longitudinal movement of said block, a key rotatably disposed in the other of the keyways of said block, a pawl on said key disposed in the endless groove of said shaft effecting longitudinal reciprocating movement of said shaft as it rotates, a spool disposed on end of said shaft for rotating and reciprocating with said shaft, and a brake lever adapted to contact said spool to stop the movement of said spool under finger pressure.

2. A spinning reel comprising a case, a crank shaft disposed in said case, a crank secured on the outer end of said shaft, a bevel gear disposed within said case and secured on said crank shaft for rotation therewith, a cylinder disposed on the side of said case, and shoulder having an aperture therein disposed on the side of said case 180° removed from said cylinder, a shaft rotatably and slidably mounted in and between said cylinder and shoulder having an endless and returning groove cut therein in its central area and a slot longitudinally milled therein, a pinion gear meshing with said bevel gear disposed on said shaft, a key in said pinion gear disposed in the slot of said shaft preventing relative rotation therebetween and permitting longitudinal sliding movement of said shaft within said pinion gear, a block disposed on said shaft, means preventing rotational and longitudinal movement of said block, a pawl riding in said block disposed in the endless groove of said shaft effecting longitudinal reciprocating movement of said shaft as it rotates, and a spool disposed on end of said shaft for rotating and reciprocating with said shaft.

3. A spinning reel comprising a case, a post supporting said case, a crank shaft disposed in said case, a crank secured on the outer end of said shaft, a bevel gear disposed within said case and secured on said crank shaft for rotation therewith, a cylinder disposed on the side of said case, and shoulder having an aperture therein disposed on the side of said case 180° removed from said cylinder, a shaft rotatably and slidably mounted in and between said cylinder and shoulder having an endless and returning groove cut therein in its central area, and a slot longitudinally milled therein, a pinion gear meshing with said bevel gear disposed on said shaft, a key in said pinion gear disposed in the slot of said shaft preventing relative rotation therebetween and permitting longitudinal sliding movement of said shaft within said pinion gear, a block disposed on said shaft, means preventing rotational and longitudinal movement of said block, a pawl riding in said block disposed in the endless groove of said shaft effecting longitudinal reciprocating movement of said shaft as it rotates, a spool disposed on end of said shaft for rotating and reciprocating with said shaft, and a brake lever pivotally mounted on said post adapted to contact said spool under hand pressure to exert a braking influence on said spool.

4. A spinning reel comprising a case, a crank shaft disposed in said case, a crank secured on the outer end of said shaft for manually rotating said crank shaft, a bevel gear disposed within said case and secured on said crank shaft for rotation therewith, a bearing disposed on the side of said case, a second bearing disposed on the side of said case 180° removed from said bearing, a shaft rotatably and slidably mounted in and between said bearings having an endless and returning groove cut therein in its central area, a pinion gear meshing with said bevel gear disposed on said shaft, means associated with said pinion gear and shaft preventing relative rotation therebetween and permitting longitudinal sliding movement of said shaft within said pinion gear, means riding in the endless groove of said shaft effecting longitudinal reciprocating movement of said shaft as it rotates, and a spool disposed on end of said shaft for rotating and reciprocating with said shaft.

5. A spinning reel comprising a case, a crank shaft rotatably disposed in the wall of said case, a gear disposed within said case secured on said crank shaft for rotation therewith, a spool shaft rotatably and slidably mounted in and between the walls of said case having an endless groove cut therein, a second gear meshing with said gear slidably keyed on said spool shaft, a block disposed on said shaft, means preventing rotational and longitudinal movement of said block, means associated with said block disposed in the endless groove of said spool shaft effecting longitudinal reciprocating movement of said shaft as it rotates, and a fish line spool disposed on said spool shaft adapted to rotate and reciprocate therewith to wind the fish-line on said spool axially and longitudinally thereof.

LEO RAKOCZY.

No references cited.